(12) United States Patent
Karnes

(10) Patent No.: US 7,338,095 B1
(45) Date of Patent: Mar. 4, 2008

(54) PLASTIC HEATING DUCT CONNECTORS

(75) Inventor: James A. Karnes, Erie, PA (US)

(73) Assignee: Dura-Tite Systems, LLC, Erie, PA (US)

( * ) Notice: Subject to any disclaimer, the term of this patent is extended or adjusted under 35 U.S.C. 154(b) by 6 days.

(21) Appl. No.: 11/296,541

(22) Filed: Dec. 5, 2005

(51) Int. Cl.
    *F16L 21/00* (2006.01)
(52) U.S. Cl. .................. 285/397; 285/23; 285/423; 24/16 PB
(58) Field of Classification Search .............. 285/23, 285/370, 397, 423, 424; 24/16 PB; 248/74.3
    See application file for complete search history.

(56) References Cited

U.S. PATENT DOCUMENTS

| | | | |
|---|---|---|---|
| 524,051 A | 8/1894 | Walker | |
| 526,285 A | 9/1894 | Ayling | |
| 3,596,936 A * | 8/1971 | Dieckmann et al. | 285/222.1 |
| 3,954,289 A | 5/1976 | Marin, Sr. | |
| 4,249,758 A | 2/1981 | Harris | |
| 4,620,729 A | 11/1986 | Kauffman | |
| 4,627,647 A | 12/1986 | Hauff | |
| 5,741,030 A | 4/1998 | Moore et al. | |
| 6,035,593 A | 3/2000 | Chao et al. | |
| RE37,086 E | 3/2001 | Moore et al. | |
| 6,196,597 B1 | 3/2001 | Karnes | |
| 6,273,145 B1 | 8/2001 | Botting | |
| 6,321,493 B1 | 11/2001 | Rillie et al. | |
| 6,363,668 B2 | 4/2002 | Rillie et al. | |
| 6,412,238 B2 | 7/2002 | Rillie et al. | |
| 6,415,563 B2 | 7/2002 | Rillie et al. | |
| 6,438,803 B2 | 8/2002 | Rillie et al. | |
| 7,101,608 B1 | 9/2006 | Karnes | |
| 2001/0049915 A1 | 12/2001 | Rillie et al. | |
| 2001/0049916 A1 | 12/2001 | Rillie et al. | |
| 2001/0052208 A1 | 12/2001 | Rillie et al. | |
| 2001/0052209 A1 | 12/2001 | Rillie et al. | |
| 2006/0199505 A1 | 9/2006 | Fettkether | |
| 2006/0199526 A1 | 9/2006 | Fettkether | |

OTHER PUBLICATIONS

AirTec Products Website Printouts; 2005 (www.airtecproducts.com).

* cited by examiner

*Primary Examiner*—Aaron Dunwoody
*Assistant Examiner*—Fannie C. Kee
(74) *Attorney, Agent, or Firm*—Oliff & Berridge, PLC

(57) ABSTRACT

A connector for connecting a terminal end of a heating duct to a heating duct board, the connector including an annular cylindrical portion with an outer surface and a maximum outer diameter and a flange extending radially outwardly from the outer surface of the annular cylindrical portion. The flange has a dimension greater than the maximum diameter forming an abutment against which a lower edge of the heating duct board abuts. The flange also has at least one sleeve for receiving a zip tie. The connector includes retention means for securing the connector to the heating duct board with the heating duct board encircling the annular cylindrical portion and being in abutting engagement with the flange. The retention includes at least one zip tie mounted through the at least one sleeve of the flange and engageable in a mouth of the heating duct board to which the connector is secured.

2 Claims, 11 Drawing Sheets

PLASTIC HEATING DUCT CONNECTORS

BACKGROUND AND SUMMARY OF THE INVENTION

The present invention is directed to the field of heating ducts. More particularly, the present invention is directed to duct boots, connectors and the like, made of plastic. This invention is related to jointly owned U.S. Pat. No. 6,196,597 entitled "Heating Duct", which is hereby incorporated by reference.

The majority of duct being installed in residential and commercial units is fabricated of sheet metal, although, recently, flex duct has become more widely used. Metal ducts pose a number of problems. First, when the duct is cut to length, the end is razor sharp and poses a handling hazard. Secondly, metal is a good conductor of heat (and electricity) and without insulation, the metal duct will lose a considerable amount of heat to an uninsulated air space. Insulating the duct is an expensive alternative, although a prudent building owner will recoup the expense over time in energy saved, especially given the projected short-term increase in fuel costs.

Thirdly, metal fittings are difficult to seal properly. The use of mastics and tapes are needed to seal the joints to prevent and overcome the excessive leaks due to metal on metal connections. Any denting of the metal further exacerbates the problem of sealing the connection. The process of using the mastics is messy and both the taping and mastic application are time consuming.

The present invention overcomes the deficiencies of metal ducts. Plastic duct is safer to handle, having no razor sharp edges. Further, plastic is a poor conductor of both heat and electricity, significantly reducing the btu's lost through the walls of the connectors. Further, tolerances on the plastic ducts can be held tighter and, plastics are not prone to denting, so junctions form tighter seals resulting in reduced air and heat loss at the junctions.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
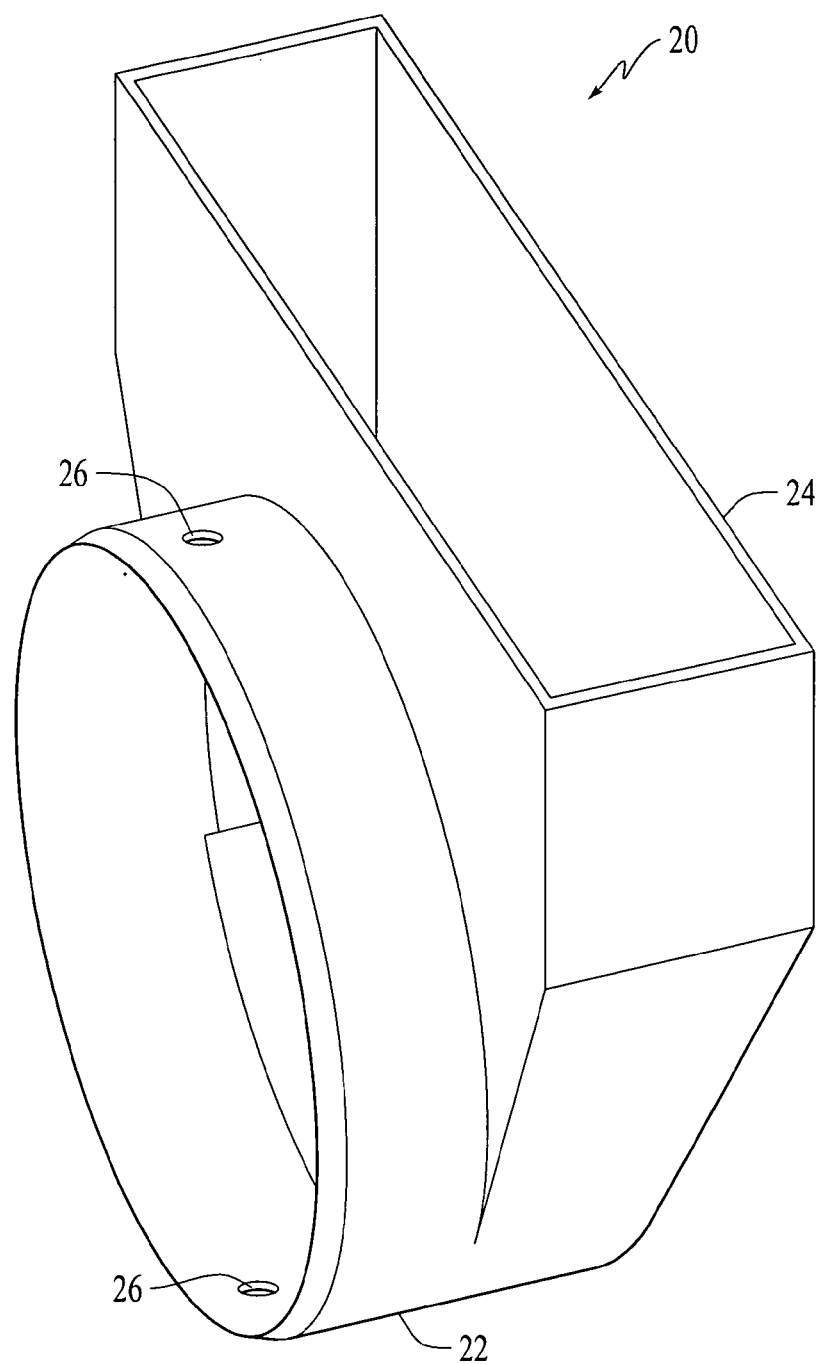
FIG. 1 is a perspective side view of a first embodiment of a plastic duct boot of the present invention.

A first embodiment of a plastic boot which forms a part of the present invention is shown in FIG. 1 generally at 20. Boot 20 is made as a one-piece injection molded plastic. The plastic used to make any of the embodiments shown herein is selected from the group consisting of acrylonitrile butadiene styrene (ABS), polyvinyl chloride (PVC), liquid crystal polymer (LCP) resin and polyphenylene sulfide (PPS), polypropylene (PP) and polyethylene (PE). Boot 20 has a cylindrical collar 22 and a rectangular body portion 24 which will engage a floor mounted exhaust grate or a rectangular extension which connects to such a grate. A plurality of holes 26 in collar 22 permit screws to attach a length of duct to boot 20. Boot 20 can be used with metal duct or flex duct.

Figure 2A:
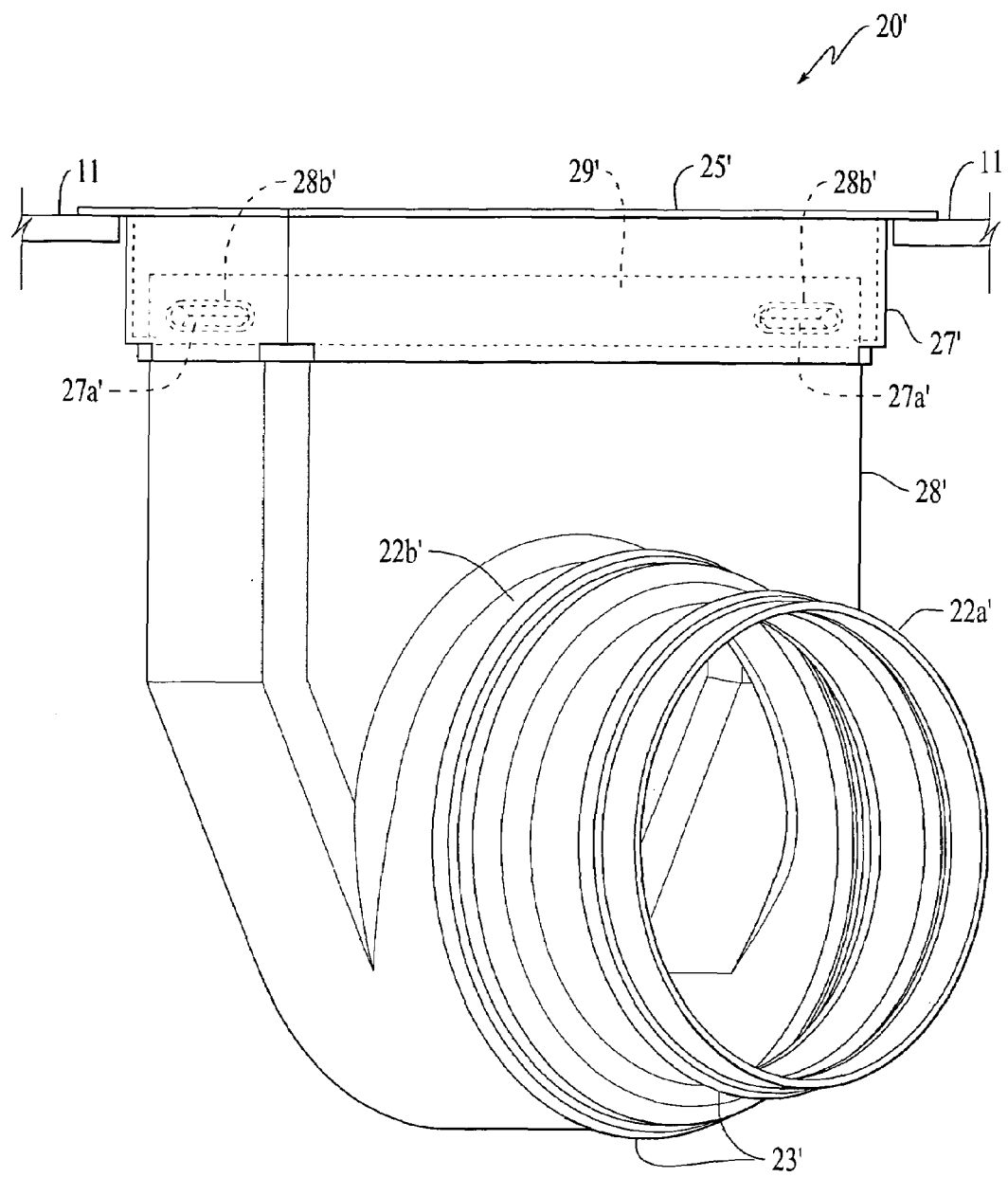
FIG. 2A is a perspective side view of a second embodiment of a plastic duct boot of the present invention.
Figure 2B:
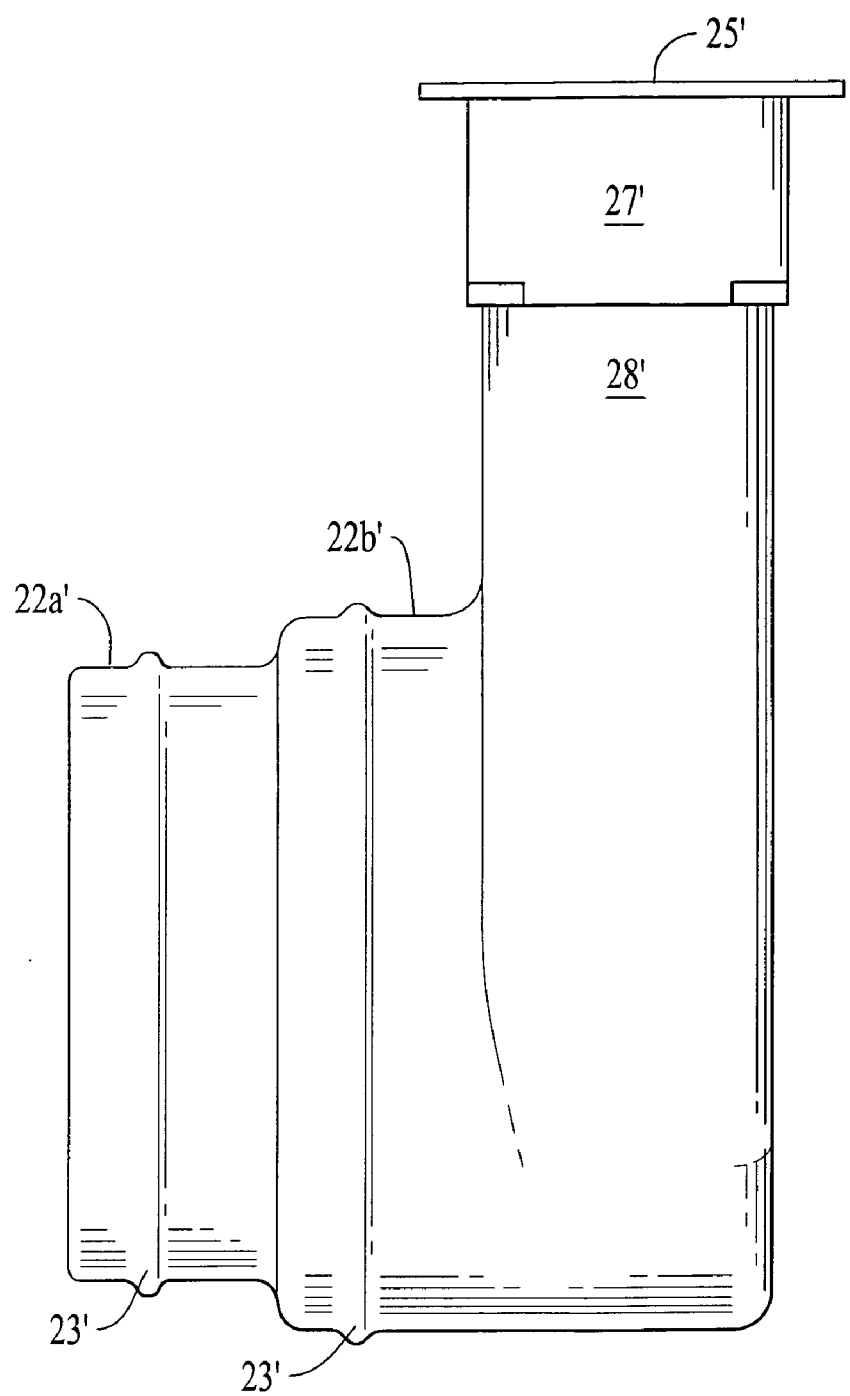
FIG. 2B is a side view of the second embodiment.

A second embodiment of plastic boot is shown in FIGS. 2A and 2B generally at 20'. Plastic boot 20' is formed with two collars 22a' and 22b' which can accommodate different diameter ducts (not shown). Plastic boot 20', and in fact, each of the embodiments depicted herein, can be used with any type of duct including, but not limited to, metal duct and flex duct. In this embodiment, collars 22a' and 22b' are each formed with an annular ridge 23' which is inserted into the duct which attaches thereto and functions as frictional securing means therefor. If used with flex duct, a hose clamp can be used outside the ridge 23' to provide improved sealing. A rectangular fitting 25' is mounted above a floor 11 with a sleeve 29' which extends through the floor 11. Sides 27' each have a rectangular protrusion 27a' which snap into rectangular recesses 28b' in rectangular upper portion 28' of boot 20' to secure the two members together.

Figure 3:
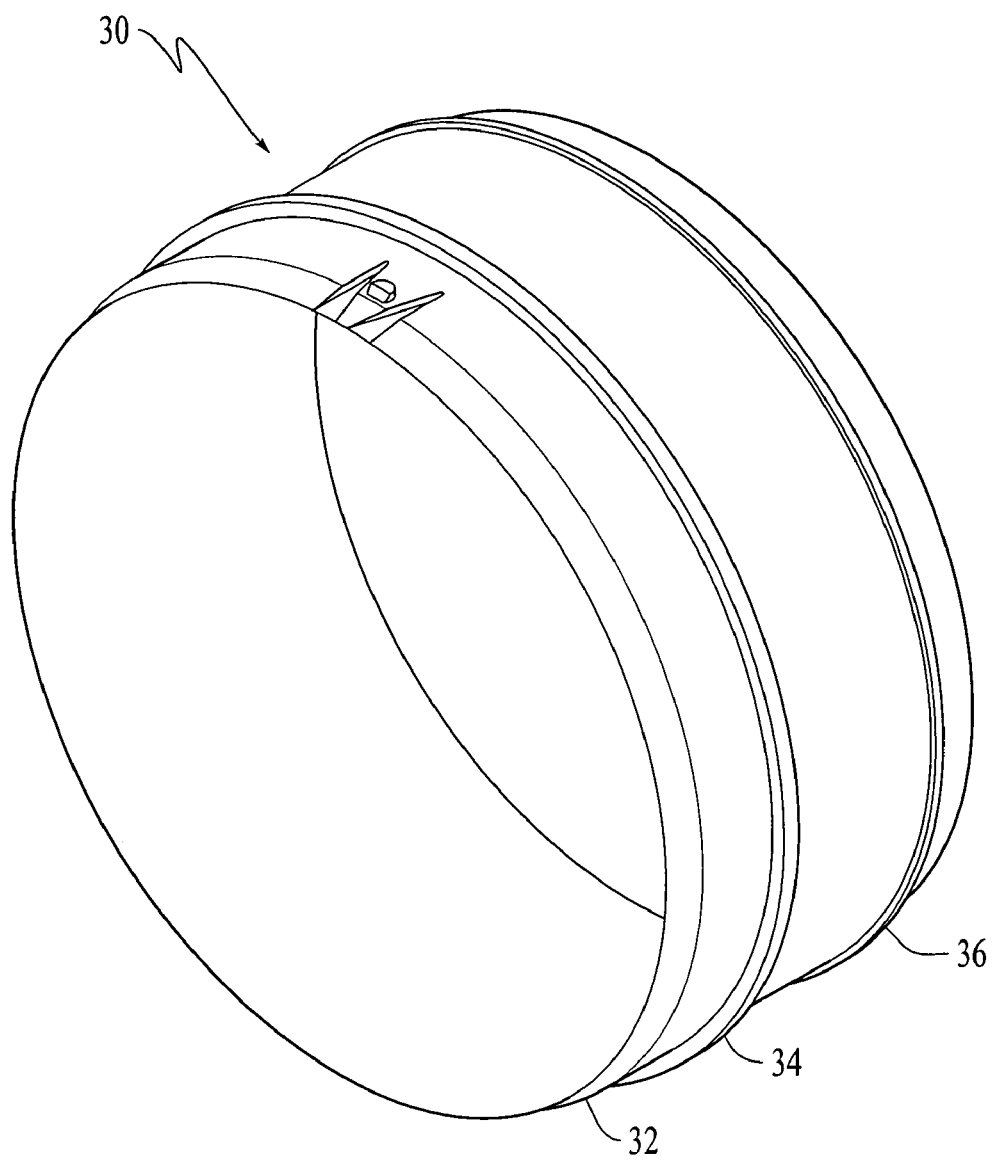
FIG. 3 is a perspective side view of a first embodiment of a boot adapter of the present invention.

FIG. 3 depicts a first embodiment of a boot adapter generally at 30. Adapter 30 is used with the first embodiment of plastic boot 20 depicted in FIG. 1. Annular cylindrical portion 32 snaps into cylindrical collar 22. First annular ridge 34 extends outwardly from cylindrical portion 32 and forms an abutment surface against which the duct may seal. In addition, second annular ridge 36 provides a sealing means for the duct (not shown) which slides thereover into engagement with first ridge 34.

Figure 4:
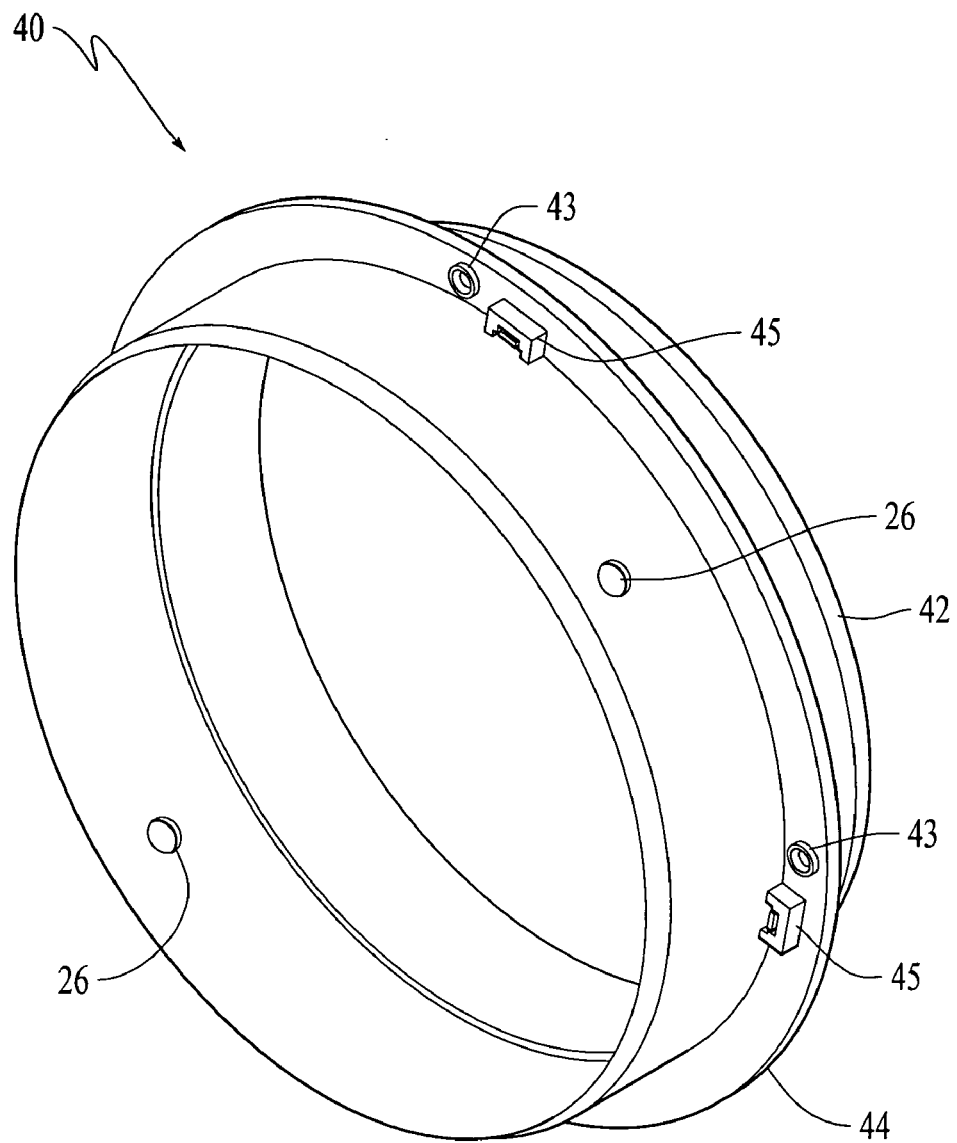
FIG. 4 is a perspective front view of a first embodiment duct board take off adapter of the present invention.
Figure 9:
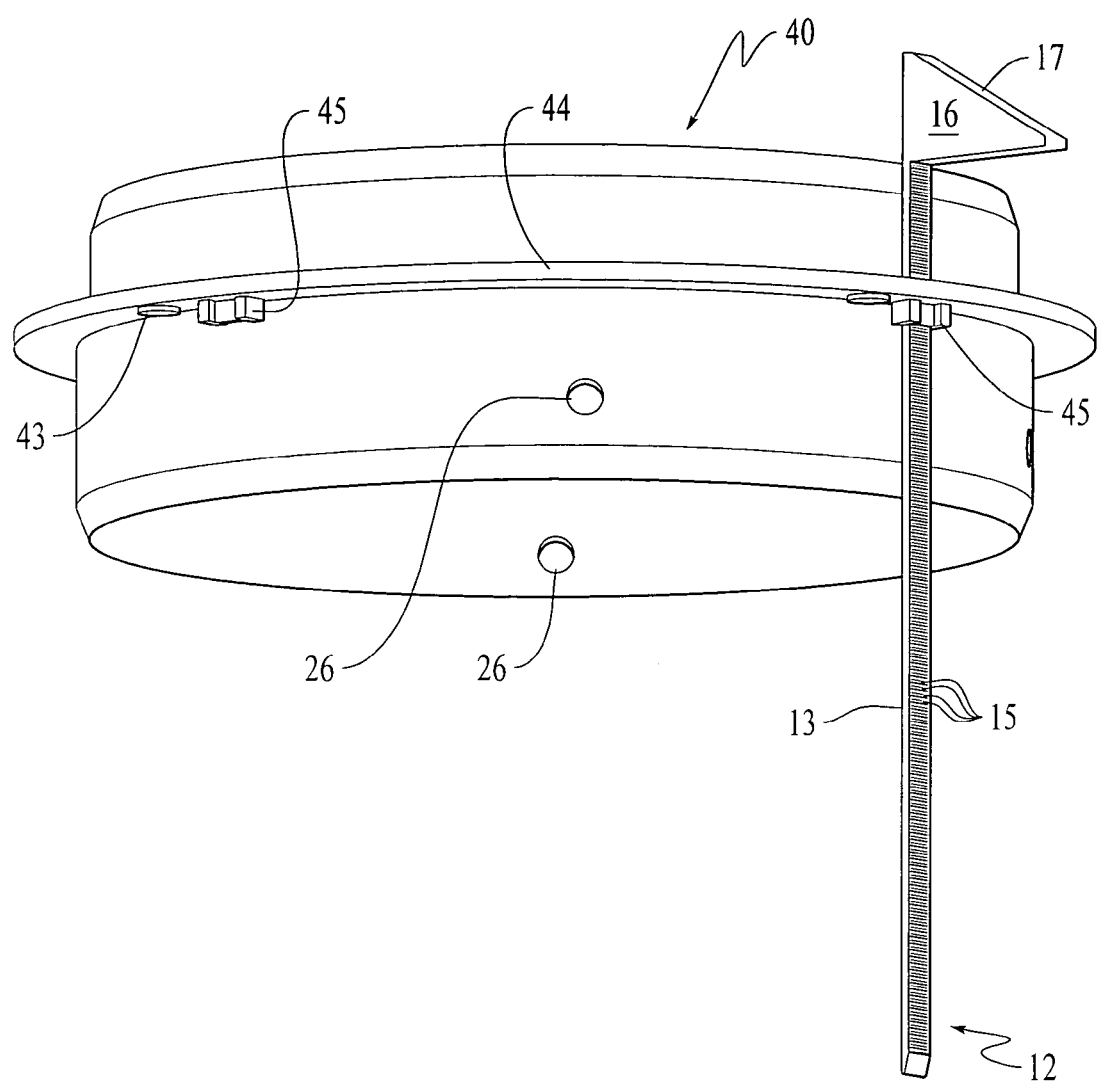
FIG. 9 is a perspective side view of the duct board connector of the present invention equipped with a zip tie.

A first embodiment of a duct board take-off adapter of the present invention is depicted in FIG. 4 generally at 40. The furnace outlet is usually jury-rigged with duct board, either metal or fiber board, to which the duct is taped in an attempt to obtain a seal. This is time consuming and generally ineffective. The take-off adapter 40 provides a better connection with a tighter seal. Adapter 40 includes a first annular cylindrical portion 42 will fit within the duct board and a first laterally extending surface portion in the form of a flange 44 extends radially outwardly and will engage the lower edge of the duct board. A plurality of holes 43 permit attachment using sheet metal screws. Alternatively, a plurality of rectangular sleeves 45 (shown here as four in number, although fewer or more can be used) receive zip-ties 13 (see FIG. 9). Zip ties 13 are commercially available and have been used on other applications such as skylight installations. Zip tie 13 is a flexible plastic strip with ridges 15 along one lateral edge and a retention member 16 formed at the upper end. Retention member 16 has a tapered surface 17 which will cam inwardly to fit within the member to which adapter 40 is being attached. Retention member 16 will then engage on a cylindrical rib inside the duct board and by pulling on distal ends 12 of zip ties, adapter 40 can be snugged into position in the duct board, freeing up the installer's hands to install screws, tape or other more permanent attachment means.

Figure 5:
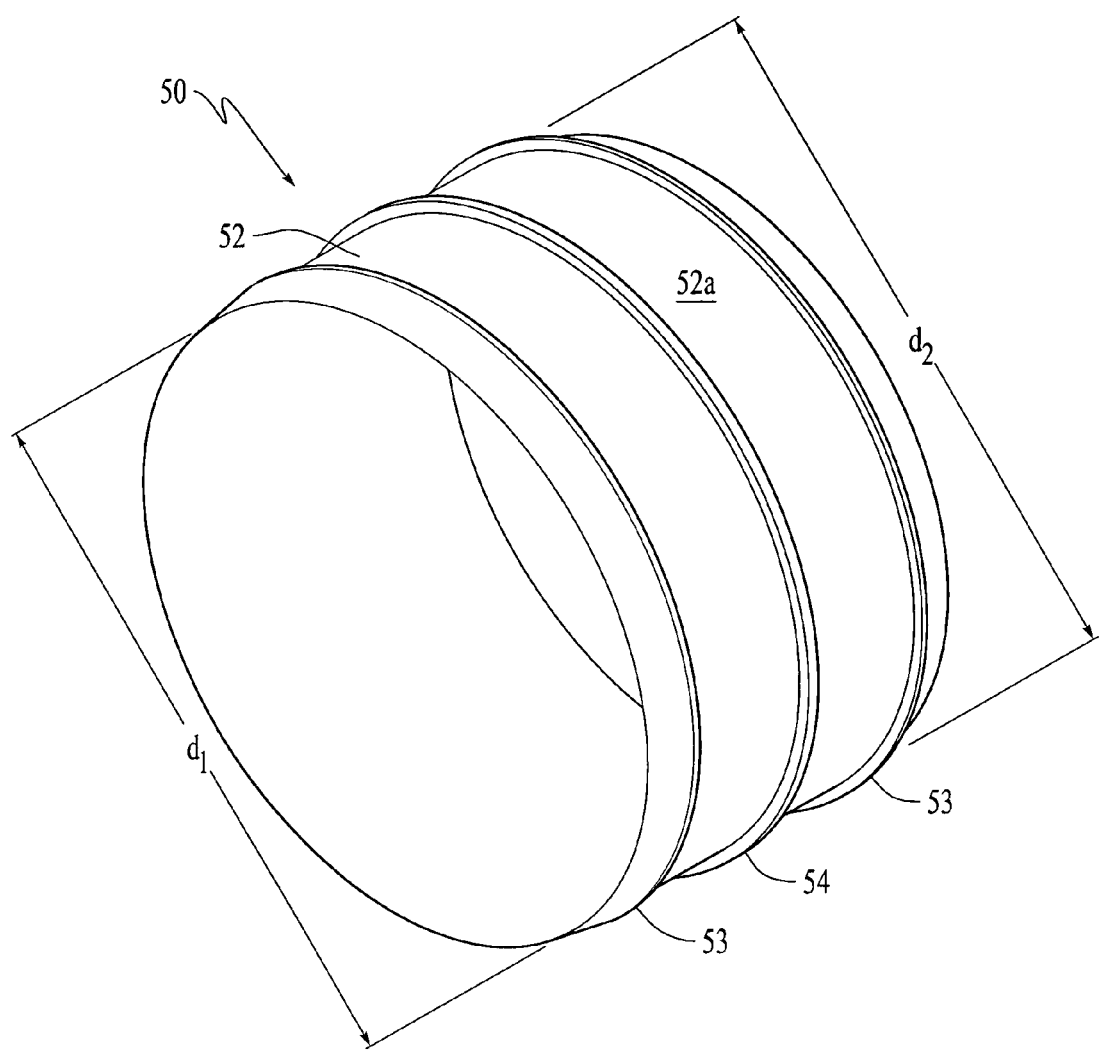
FIG. 5 is a perspective side view of a first embodiment of a flex duct connector of the present invention.

FIG. 5 shows a first embodiment of a flex-to-flex connector 50. Connector 50 has a first annular cylindrical portion 52 with a first maximum diameter $d_1$. A first laterally extending surface portion in the form of an annular ridge 54 is generally centered on connector 50. A second annular cylindrical portion 52a is formed on the other end having a second maximum diameter $d_2$. For most applications, $d_1$ will equal $d_2$. However, on occasion, it may be beneficial for connector 50 to function as a reducer, as well. In that case, $d_1 > d_2$. Each annular cylindrical portion 52, 52a, has a second annular ridge 53 which functions as a retaining means as in the case with the earlier embodiments. The flex duct will attach to annular cylindrical portions 52, 52a and the ends will butt up against both sides of annular ridge 54.

Figure 6:
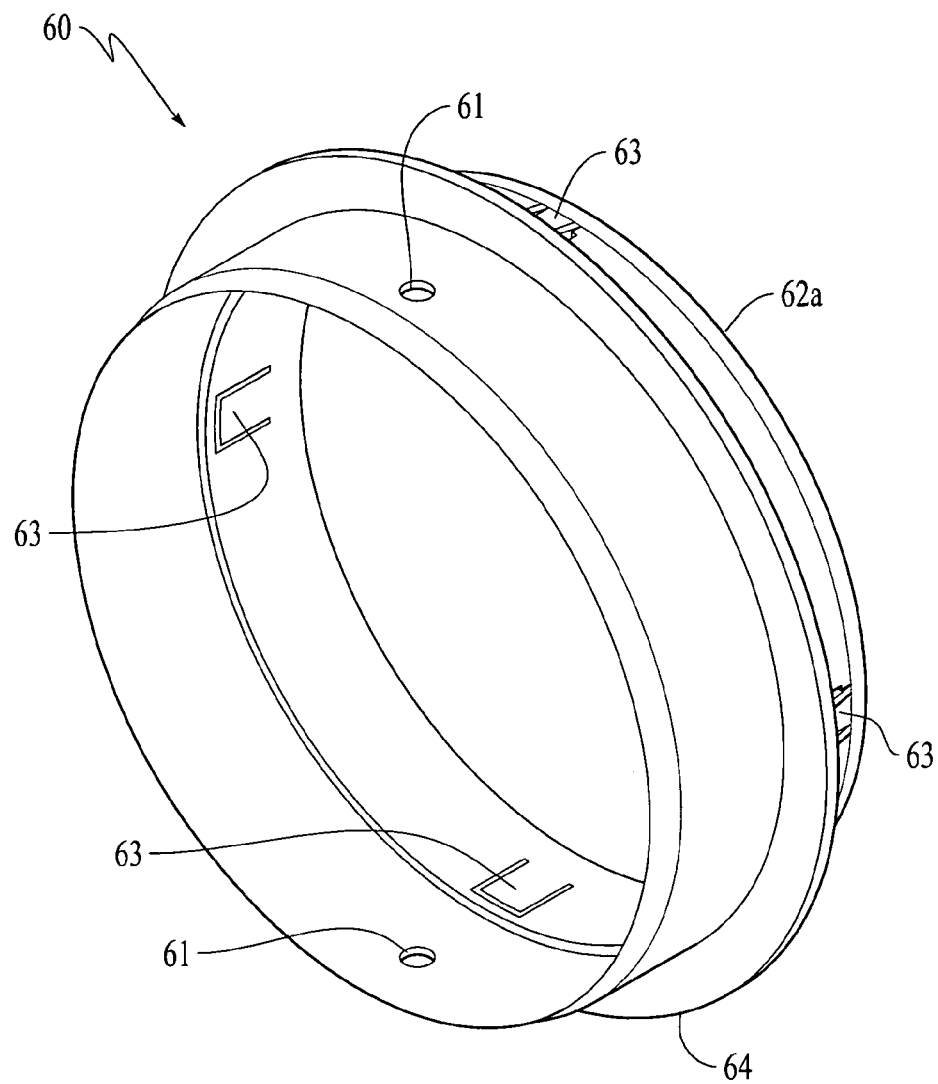
FIG. 6 is a perspective side view of a duct board take off adapter for use with tight tolerance metal duct.

FIG. 6 shows a first embodiment of a plastic duct board take-off 60 used with tight tolerance metal duct. A first annular cylindrical portion 62 will be received in the duct board and holes 61 will accommodate threaded fasteners to secure take-off 60 thereto. Annular ridge 64 creates an abutment surface for the duct board and the duct on the opposite side which, in this case, is tightly toleranced metal duct. A second annular cylindrical portion 62a will be received in the metal duct. A plurality of integral spring fingers 63 (shown here as numbering four, although fewer or more could be used without departing from the spirit of the invention) will flex inwardly as second annular cylindrical portion is inserted into the duct and then spring outwardly engaging behind a flange to retain the duct tightly butting against first annular ridge 64.

Figure 7:
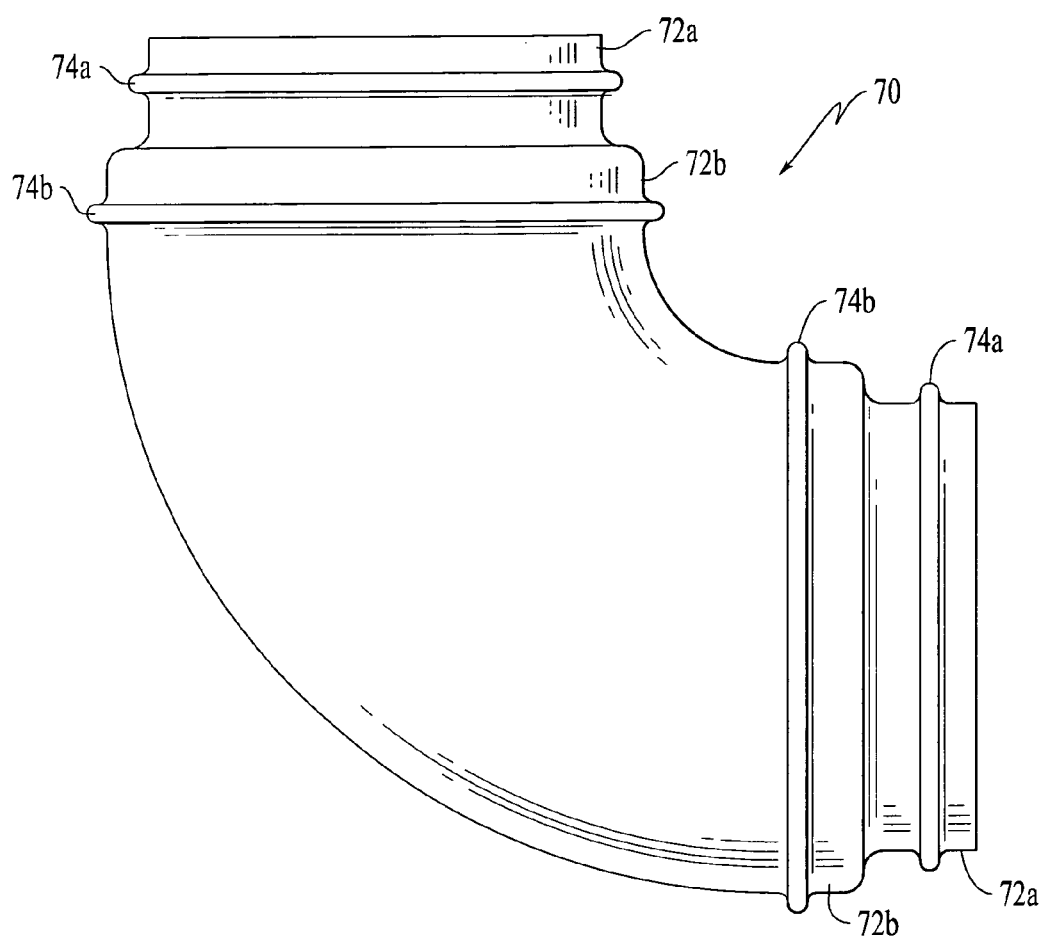
FIG. 7 is a side view of a first embodiment of a multi-diameter 90° elbow of the present invention.

FIG. 7 depicts a first embodiment of a dual size 90° elbow 70. Should it be necessary to change direction of the duct, elbow 70 can be inserted in the line. Elbow 70 is formed with two annular cylindrical portions 72a, 72b. If the first cylindrical portion 72a accommodates the size duct being used, the duct can be slipped over annular ridge 74a which will frictionally engage therein to retain the duct engaged thereon. As with previous embodiments, a hose clamp may be employed to enhance sealing of the duct on the elbow 70. If the duct is of a larger diameter than cylindrical portion 72a, it may be cut off the end of the elbow 70 and the duct slipped over annular ridge 74b to secure it to the elbow.

Figure 8:
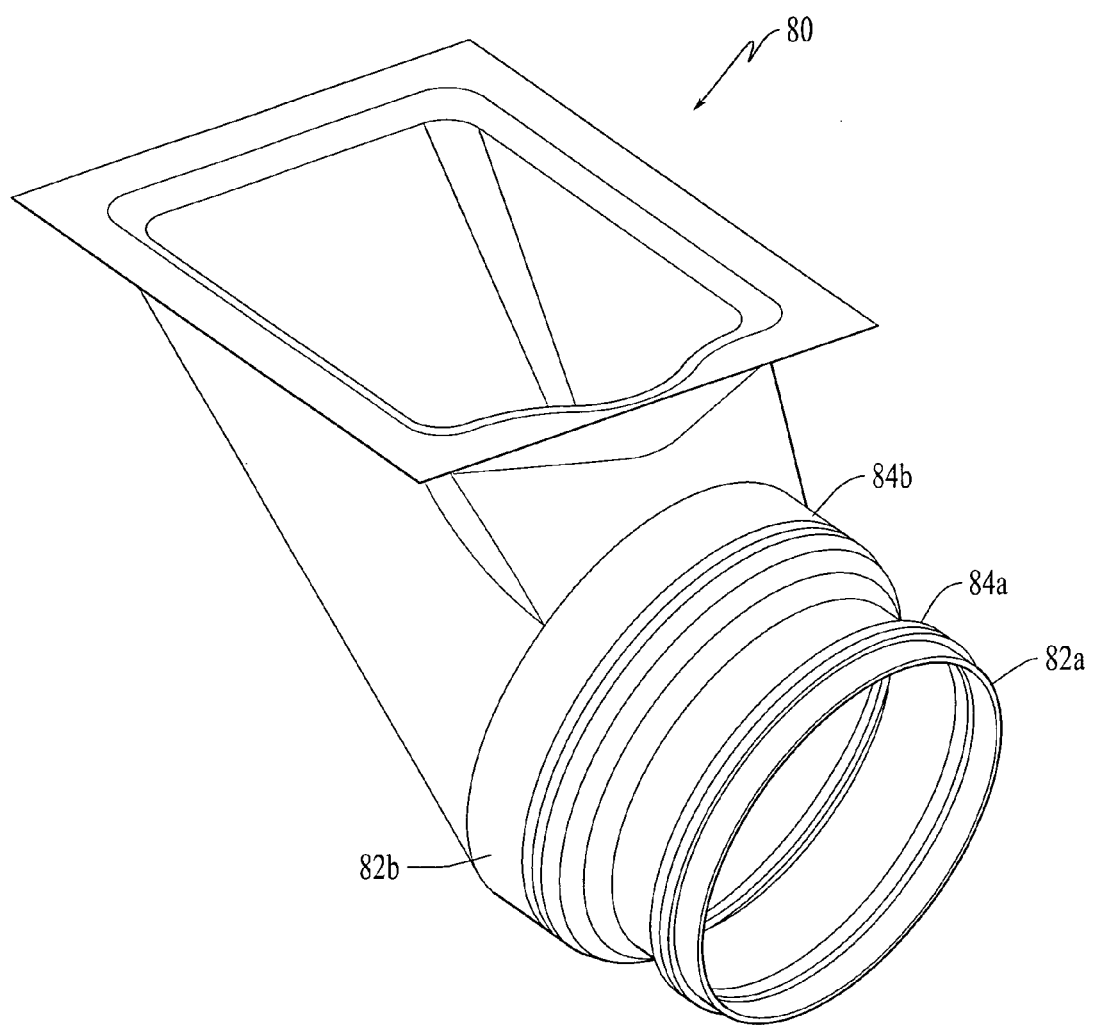
FIG. 8 is a side perspective view of a first embodiment of an angled duct board take off.

A first embodiment of an angled take-off for duct board is shown in FIG. 8 generally at 80. This angled take-off will mount against the flat surface of a rectangular duct board and provide connection for flex duct or metal duct, as the application dictates. As with earlier embodiments, the angled take-off 80 is fitted with a first annular cylindrical portion 82a having a first maximum outer diameter and a second annular cylindrical portion 82b having a second larger diameter. Each annular cylindrical portion 82a, 82b is equipped with an annular ridge 84a, 84b, respectively to provide retention means for the attached duct.

Figure 10:
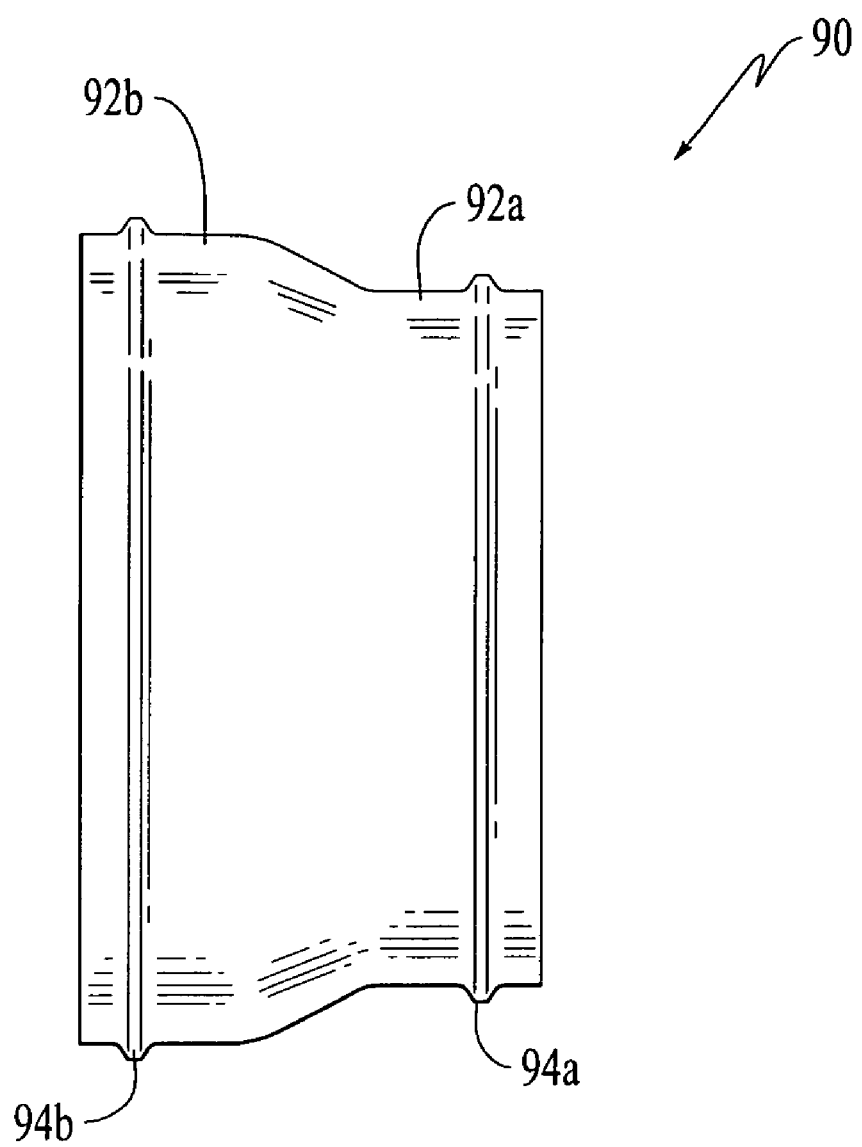
FIG. 10 is a perspective side view of an adapter of the present invention.

A first embodiment of an adapter of the present invention is shown in FIG. 10 generally at 90. Adapter 90 can be used with an existing boot to accommodate a larger or smaller sized duct or may be placed in line to transition from one sized duct to a larger or smaller size. A first annular cylindrical portion 92a is equipped with an annular ridge 94a, while a second larger annular cylindrical portion 92b is equipped with an annular ridge 94b.

Various changes, alternatives and modifications will become apparent to one of ordinary skill in the art following a reading of the foregoing specification. For example, integral gasketing can be afforded the flanges of the connectors. It is intended that any such changes, alternatives and modifications as fall within the scope of the appended claims be considered part of the present invention.

I claim:

1. A connector made of plastic for connecting a terminal end of a heating duct to a heating duct board, the connector comprising:
    at least one annular cylindrical portion with an outer surface and a maximum outer diameter;
    a flange extending radially outwardly from the outer surface of the annular cylindrical portion, the flange having a dimension greater than the maximum diameter forming an abutment against which a lower edge of the heating duct board abuts, and having at least one rectangular sleeve for receiving a zip tie;
    retention means for securing the connector to the heating duct board with the heating duct board encircling the annular cylindrical portion and being in abutting engagement with the flange, wherein the retention means comprises at least one zip tie, mounted through the at least one rectangular sleeve of the flange and through the flange, and engageable in a mouth of the heating duct board to which the connector is secured.

2. The connector of claim 1 wherein the connector is made of a material selected from the group consisting of acrylonitrile butadiene styrene (ABS), polyvinyl chloride (PVC), liquid crystal polymer (LCP) resin and polyphenylene sulfide (PPS), polypropylene (PP) and polyethylene (PE).

* * * * *